(12) United States Patent
Naldi

(10) Patent No.: US 6,321,629 B1
(45) Date of Patent: Nov. 27, 2001

(54) PANEL CUTTING MACHINE FEATURING PANEL PRESSURE CLAMPING DEVICES

(75) Inventor: Valter Naldi, Bologna (IT)

(73) Assignee: Selco S.r.l., Pesaro (IT)

( * ) Notice: Subject to any disclaimer, the term of this patent is extended or adjusted under 35 U.S.C. 154(b) by 611 days.

(21) Appl. No.: 08/730,724

(22) Filed: Oct. 11, 1996

(30) Foreign Application Priority Data

Oct. 11, 1995 (IT) .................................. B095A0482

(51) Int. Cl.[7] .................. B26D 11/00; B26D 1/00
(52) U.S. Cl. ................. 83/863; 83/863; 83/698.42; 83/698.41; 83/614
(58) Field of Search ............ 83/863, 614, 698.41, 83/666, 698.42; 451/357, 441, 344, 342

(56) References Cited

U.S. PATENT DOCUMENTS

| | | | |
|---|---|---|---|
| 3,718,061 | * | 2/1973 | Wilkin ........................... 83/155 |
| 4,779,382 | * | 10/1988 | Rudolf et al. ................. 451/342 |
| 4,829,868 | * | 5/1989 | Jenkner ......................... 83/863 |
| 4,941,292 | * | 7/1990 | Rudolf et al. ................. 83/666 |
| 4,989,374 | * | 2/1991 | Rudolf et al. ................. 83/666 |
| 5,058,909 | * | 10/1991 | Rudolf et al. ................. 83/666 |
| 5,157,873 | * | 10/1992 | Rudolf et al. ............... 83/698.41 |
| 5,199,223 | * | 4/1993 | Rudolf et al. ................. 451/342 |
| 5,333,526 | * | 8/1994 | Suzuki ........................... 83/863 |
| 5,503,053 | * | 4/1996 | Onishi et al. .................. 83/614 |
| 5,611,253 | * | 3/1997 | Saito et al. .................... 83/614 |

FOREIGN PATENT DOCUMENTS

| | | |
|---|---|---|
| 89 08 563 | 9/1989 | (DE) . |
| 2540109 | * 10/1977 | (DE) ............................. 83/863 |
| 2818421 | * 1/1979 | (DE) ............................. 83/863 |
| 0 267 156 | 10/1987 | (EP) . |
| 0 471 197 | 7/1991 | (EP) . |
| 0 539 961 | 5/1993 | (EP) . |
| 59 201714 | 3/1985 | (JP) . |

* cited by examiner

Primary Examiner—M. Rachuba
(74) Attorney, Agent, or Firm—Israel Gopstein

(57) ABSTRACT

A machine for cutting panels, featuring pressure clamping devices for clamping the panels; the machine being characterized in that the carriage houses a supporting and fast-fit connecting element for supporting a cutting tool presenting a circular saw and a fast-fit connector for connection to the element.

7 Claims, 4 Drawing Sheets

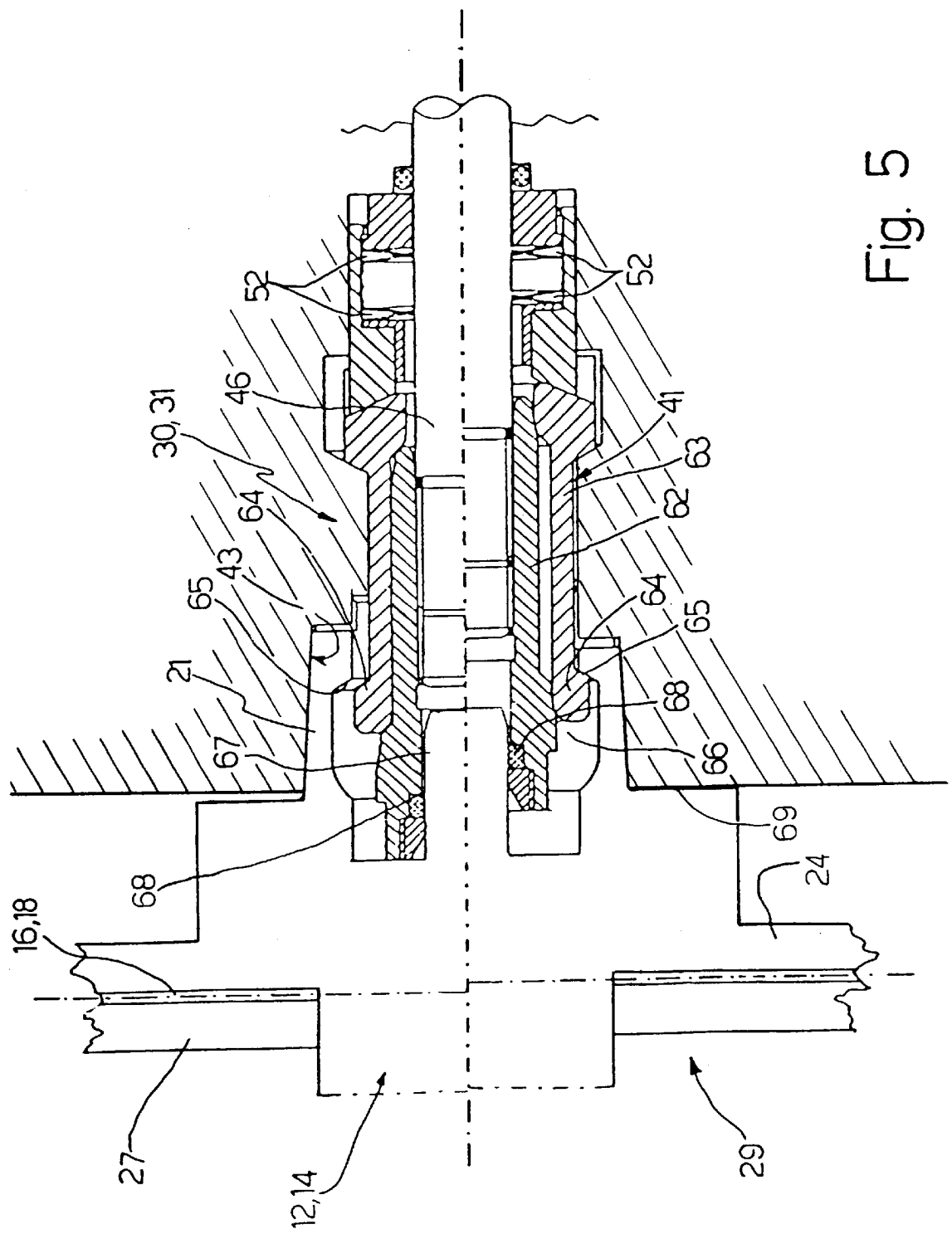

PANEL CUTTING MACHINE FEATURING PANEL PRESSURE CLAMPING DEVICES

BACKGROUND OF THE INVENTION

The present invention relates to a panel cutting machine.

Known machines for cutting large flat panels from which to produce shelves or similar structures feature a worktable defined at the top by a substantially flat, horizontal surface, and presenting a straight lateral guide parallel to the substantially flat surface and supporting in sliding manner a carriage fitted with a cutting assembly for cutting the panel parallel to the direction of said straight lateral guide.

The cutting assembly normally features a pair of tools comprising a pair of circular saws of different diameters and defining a cutting plane perpendicular to the substantially flat surface; the carriage is fitted with a spindle for each circular saw, which is fitted coaxially to a toolholder body, the shank of which is housed inside the respective spindle; the first of the two saws in the traveling direction of the carriage is a notching tool for preparing the panels for the actual cutting operation; and the second saw completes the cutting of the panels, and therefore presents a larger diameter than the first.

To change the tools when no longer suitable for use, the machine operator, after first locking the machine and resetting the carriage to the idle position, takes the tool-clamping flange off the respective spindle; takes the saw off the respective toolholder; fits the new saw on to the toolholder; fits the toll-clamping flange back on to the respective spindle; and then starts the machine up again. Each of the above operations therefore involves a fair amount of downtime, which seriously impairs the output of the machine.

SUMMARY OF THE INVENTION

It is an object of the present invention to provide a cutting machine designed to overcome the aforementioned drawbacks, and which provides for considerably reducing downtime for retooling the machine.

According to the present invention, there is provided a machine for cutting panels and featuring pressure clamping devices for clamping the panels; the machine comprising a frame presenting a substantially horizontal worktable, and guides extending to the side of the frame in a given substantially horizontal direction; and a carriage fitted in freely-sliding manner to the guides so as to move, in relation to the frame, to and from an idle position wherein the carriage is located laterally in relation to the worktable; characterized in that the carriage houses first supporting and fast-fit connecting means for engaging and supporting at least one cutting tool presenting second supporting means and a saw for cutting the panels.

BRIEF DESCRIPTION OF THE DRAWINGS

A non-limiting embodiment of the present invention will be described by way of example with reference to the accompanying drawings, in which:

FIG. 5 shows a section of a second connecting system used in the present invention.

DETAILED DESCRIPTION OF THE INVENTION

Figure 1:
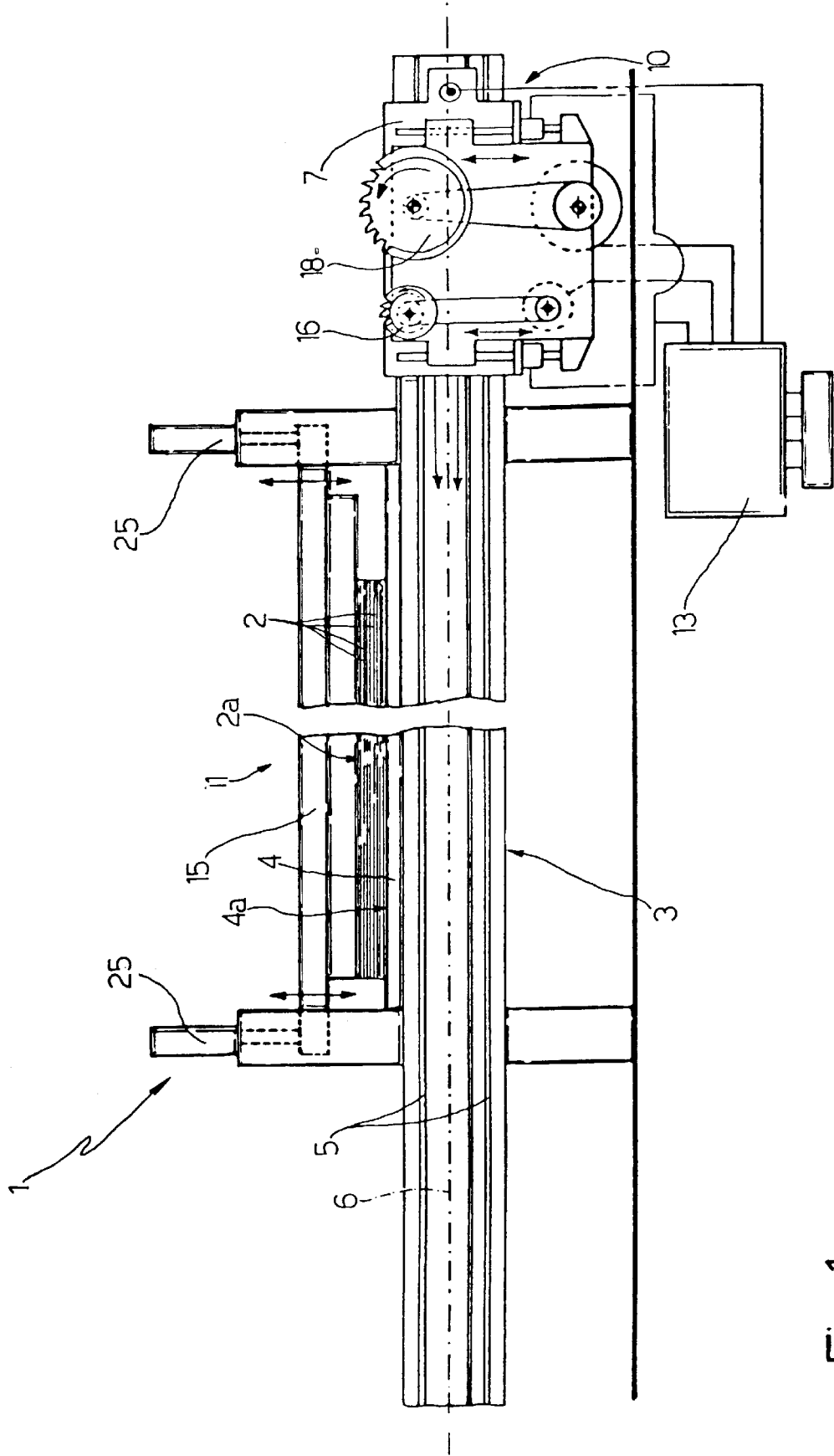
FIG. 1 shows a schematic front view of a machine in accordance with the present invention.

Number 1 in FIG. 1, in which only the parts pertinent to the present invention are numbered, indicates a machine for cutting single panels 2 or packs 2a of panels 2, each of which is preferably, but not necessarily, flat and rectangular, and is made, for example, of wood, aluminum, plastic, or epoxy resin.

Machine 1 comprises a frame 3 presenting a rectangular worktable 4 defined at the top by a flat, substantially horizontal surface 4a and in turn presenting, laterally, two straight guides 5 extending in a given direction 6 parallel to one side of and beneath worktable 4.

Figure 2:
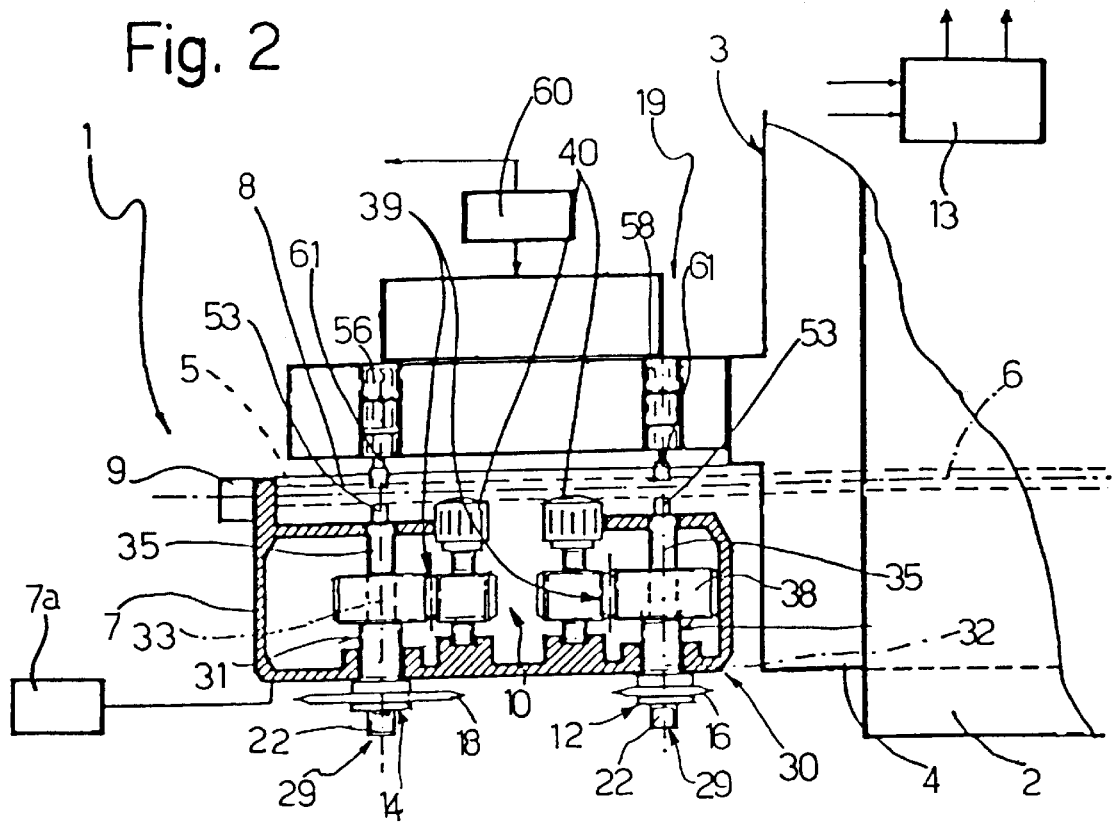
FIG. 2 shows a larger-scale, partially sectioned, schematic plan view of a portion of the FIG. 1 machine.

With reference to FIGS. 1 and 2, machine 1 also comprises a box carriage 7 presenting a slide 8 (FIG. 2) fitted in freely-sliding manner to guides 5 so that, by means of an actuating assembly 7a (FIG. 2), carriage 7 is movable along guides 5 to and from an idle position in which slide 8 contacts a limit stop 9 fitted to the end of guides 5 on the opposite side to worktable 4. Carriage 7 (FIG. 2) also presents a cutting assembly 10 (described in detail later on) supporting a first and second toolholder body 12 and 14, each fitted integrally with a circular saw 16, 18 as described later on.

With reference to FIG. 1, frame 3 presents a clamping device 11 located over worktable 4 and for firmly clamping panel 2 or pack 2a of panels 2 in the cutting position. Clamping device 11 presents a bar 15 extending in direction 6 and movable, by means of linear actuators 25 and perpendicularly to surface 4a, to and from a position contacting the top panel 2 in pack 2a on worktable 4. Linear actuators 25 are fitted to frame 3 on the opposite side of worktable 4 to guides 5, present respective longitudinal axes substantially perpendicular to surface 4a, and therefore provide for moving bar 15 vertically (i.e. perpendicularly to direction 6) to and from the contacting position, in which they act as thrust members for exerting sufficient downward pressure to clamp panel 2 (or pack 2a of panels 2) in the cutting position.

Machine 1 comprises a control unit 19 (FIG. 2) which can be controlled by an electronic control unit 13, and which cooperates with cutting assembly 10 to change toolholder bodies 12 and 14, and is described in detail later on.

Saw 16, 18 presents a central hole by which it is centered on respective body 12, 14, and a number of holes equally spaced about the central hole (not shown); and, to support saw 16, 18 integrally, body 12, 14 presents a substantially cylindrical central portion 20 (FIG. 3) for the central hole of saw 16, 18, and is defined by two end portions 21 and 22 coaxial with each other and with saw 16, 18. More specifically, whereas portion 22 is substantially cylindrical, portion 21 is conical and presents an integral pin 23 with a mushroom-shaped free end 23a. Between portions 20 and 21, body 12, 14 also presents a flange 24 formed in one piece with body 12, 14 and presenting parallel threaded holes 26 equally spaced about the central axis of symmetry; and an annular body 27 substantially identical to flange 24 and presenting a central hole by which to fit body 27 on to portion 20. More specifically, once fitted on to portion 20, saw 16, 18 is retained in position by body 27 and by screws 28 screwed inside holes 26 to clamp body 27 against flange 24. As such, saw 16, 18 and body 12, 14 form a tool 29 presenting two connecting shanks, a first of which is conical and defined by portion 21, and a second of which is cylindrical and defined by portion 22.

Portion 22 is essential in the event tool 29 is assembled and disassembled automatically, in which case, portion 22 is gripped between the gripping arms of a gripper forming part of a tool-change device (not shown).

Cutting assembly 10 comprises a pair of spindles 30 and 31 (FIGS. 2, 3), each of which supports a respective body 12, 14, presents a respective horizontal longitudinal axis 32, 33 perpendicular to direction 6, and is fitted in axially-fixed, angularly-free manner to carriage 7.

Figure 3:
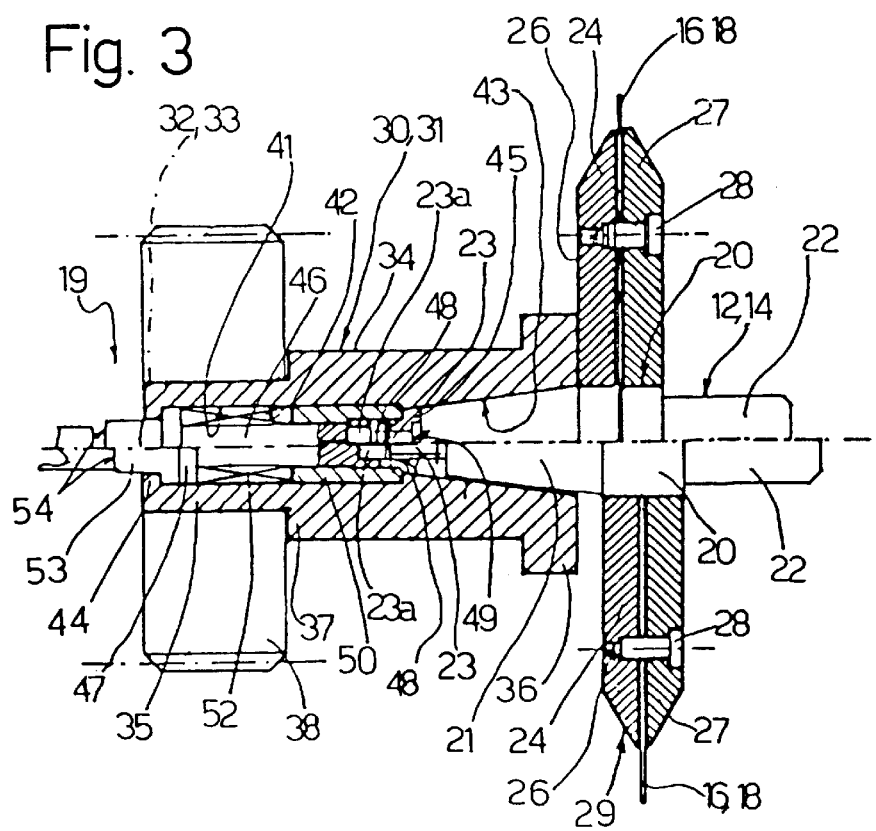
FIG. 3 shows a larger-scale, partially sectioned plan view, with parts removed for clarity, of FIG. 2.
Figure 4:
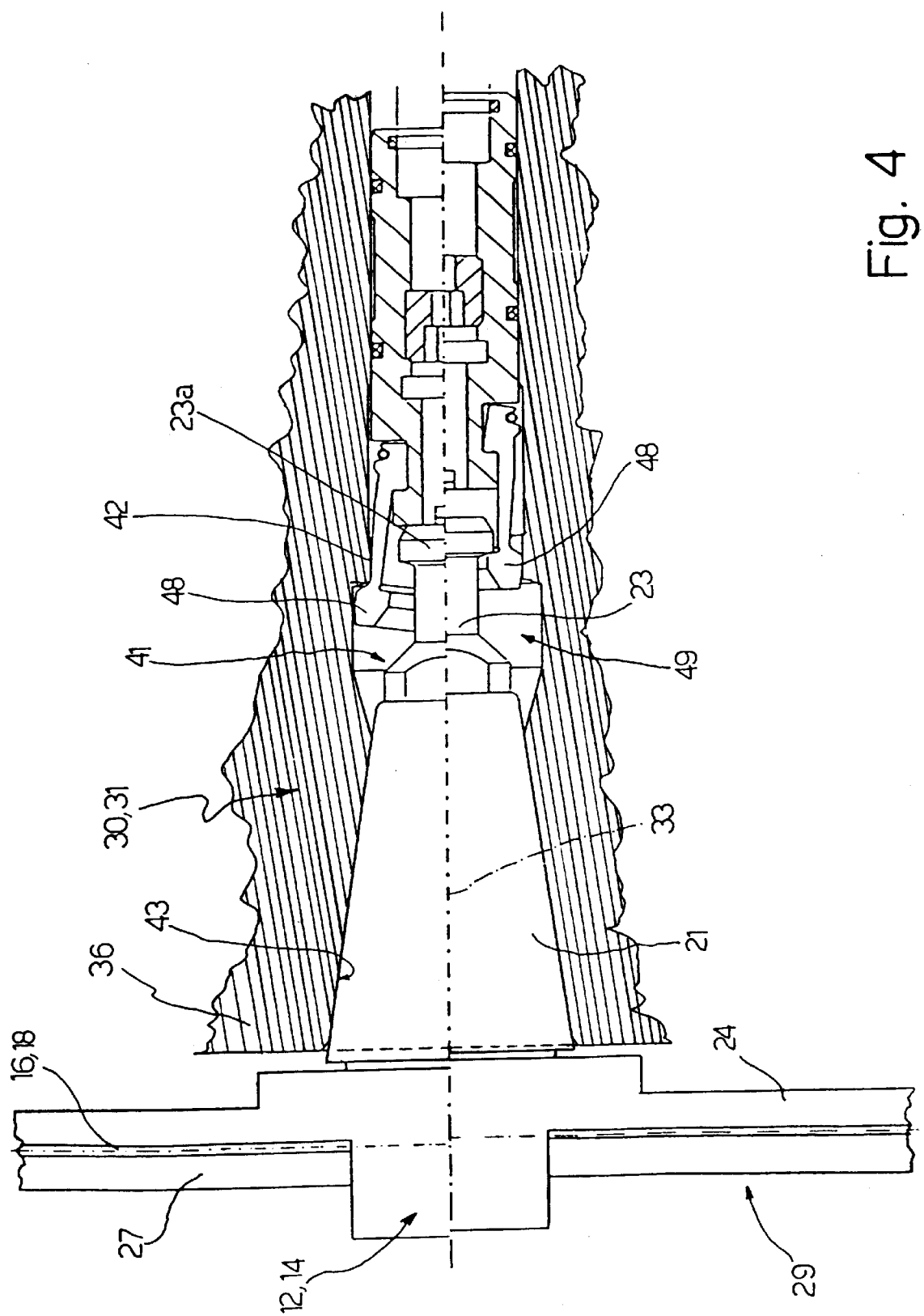
FIG. 4 shows a section of a first connecting system used in the present invention and shown roughly in FIG. 3.

With reference to FIGS. 2, 3 and 4 (which shows a ISO supporting system), spindle 30, 31 comprises a hollow body 34 coaxial with axes 32, 33 and presenting two cylindrical end portions 35 and 36 coaxial with each other and with axes 32, 33. More specifically, portion 36 is substantially a flange and presents a larger outside diameter than portion 35. Body 34 also presents a cylindrical portion 37 coaxial with axes 32, 33, and which is located between and presents an outside diameter between those of portions 35 and 36. Portion 35 is fitted with a gear 38 driven, via a transmission 39, by an electric actuator 40, which therefore rotates both body 34 and spindle 30, 31 about axes 32, 33 (FIG. 2).

Body 34 presents a longitudinal through cavity 41 coaxial with axes 32, 33, and in turn presenting, at portion 35 and part of portion 37, a cylindrical surface portion 42, and, at the opposite end to portion 35, a conical surface portion 43 housing portion 21 in complementary manner to impart cutting motion to respective saw 16, 18. Portion 42 is defined axially by two projections 44 and 45, the second of which separates portions 42 and 43.

Portion 42 houses in axially-sliding, angularly-fixed manner a tie 46 coaxial with axes 32, 33 and presenting, at the projection 44 end, an annular portion 47, the outside diameter of which is approximately equal to that of portion 42 to guide the tie 46 along portion 42. Tie 46 also presents a number of elastic gripping arms 48 equally spaced about axes 32, 33 and defining a gripper 49 for selectively engaging pin 23 and retaining respective end 23a thereof to form a rigid connection between tool 29 and body 34. Inside portion 42 and about gripper 49, provision may be made for a sleeve 50 (FIG. 3) presenting a number of inner grooves, each of which acts as a guide for one of the elastic gripping arms 48 to control the deformation of arms 48 during axial displacement of tie 46, and to prevent tie 46 from rotating about axes 32, 33.

Portion 42 also houses, between sleeve 50 and projection 44, a number of Belleville washers 52 for opposing or assisting the movement of tie 46; and tie 46 presents an end portion 53 projecting from portion 35, extending from portion 47, and defined axially by a flat face 54 perpendicular to axes 32, 33.

Control unit 19 presents two substantially identical linear actuators 56 and 58 (FIG. 2) coaxial with respective spindles 31 and 30. Each actuator 56, 58 is operated by a central control unit 60, and presents a rod 61 coaxial with respective axis 33, 32, and which is movable to and from a withdrawn idle position to move respective tie 46, in opposition to washers 52, in such a manner as to open or close gripper 49 to change tool 29.

Designing the machine to simultaneously receive both saw 16, 18 and toolholder body 12, 14 (i.e. the whole tool 29) by means of a fast-fit connector structure (including gripper 49 of spindle 30, 31 and portion 21 of toolholder body 12, 13) therefore provides for rapid assembly of one or more sharpened saws.

The fast-fit connector described also enables tool-change to be effected manually or automatically by means of one or more automatic tool loading and unloading stations.

FIG. 4 shows a larger-scale, more detailed view of the FIG. 3 fast-fit connector, of which a number of parts, namely sleeve 50, grooves 51 and Belleville washers 52, have been eliminated for the sake of clarity. The top half of FIG. 4 shows the situation in which tool 29 has not yet been clamped by gripper 49, and the bottom half the situation in which arms 48 of gripper 49 grip pin 23 and respective end 23a.

FIG. 5 shows an alternative embodiment of the fast-fit connector in FIG. 4.

More specifically, FIG. 5, in which the parts common to the previous drawings are indicated using the same numbering system, shows a fast-fit connector in which conical end portion 21, as opposed to being pushed against the conical surface of portion 43 of cavity 41 by pin 23 and end 23a being gripped by gripper 49 and drawn rightwards, is "clamped from the inside" so to speak. That is, the rightward movement of tie 46, due to the action of washers 52, produces a rightward movement of a first bush 62, which in turn flares a second expansible bush 63 (bottom half of FIG. 5), so that a stop portion 64 on second expansible bush 63 contacts a shoulder 65 forming an integral part of a cavity 66 formed in conical end portion 21. When expanded, second expansible bush 63 therefore causes the outer surface of conical end portion 21 to press against conical portion 43 of cavity 41 and the body 12, 14 to press against surface 69 of spindle 30, 31 in order to improve the system stability, thus gripping the whole of tool 29 inside its seat. Provision is made inside cavity 66 for a projecting element 67, which is inserted inside first bush 62, which presents a sealing element 68 for supporting element 67.

Conversely, tool 29 is released from its seat by simply moving tie 46 leftwards (in FIG. 5) by means of control unit 19; washers 52 are thus compressed to move first bush 62 leftwards in the FIG. 5 embodiment (top half of FIG. 5); the leftward movement of bush 62 restores second expansible bush 63 to its initial position, i.e. stop portion 64 disengages shoulder 65 of cavity 66 (top half of FIG. 5); and the outer surface of conical end portion 21 is released from conical portion 43 of cavity 41, and body 12, 14 is also released from surface 69 of spindle 30, 31. Thus enabling withdrawal of the whole of tool 29, either manually or automatically by means of an appropriate automatic system (not shown).

Clearly, therefore, the FIG. 5 embodiment also provides for greatly reducing the time required to assemble and remove tool 29 on and off carriage 7.

What is claimed is:

1. A machine (1) for cutting panels (2) and including pressure clamping devices (25) for clamping the panels, the machine (1) further including a frame (3) having a substantially horizontal worktable (4), and guides (5) extending to the sides of the frame (3) in a given substantially horizontal direction (6); and a carriage (7) fitted in freely-sliding manner to said guides (5) so as to move, in relation to said frame (3), to and from an idle position wherein said carriage (7) is located laterally in relation to said worktable (4); the machine (1) being characterized in that said carriage (7) houses first supporting and fast-fit connecting means (30, 31) having a respective longitudinal first axis (32, 33) perpendicular to said direction (6); said first supporting and fast-fit connecting means (30, 31) engaging and supporting at least one cutting tool (29) including a second fast-fit connecting means (21) and a saw (16, 18) for cutting said panels (2) in said direction (6);

wherein said first supporting and fast-fit connecting means (30, 31) comprises a first bush (62) and a second flexible bush (63) coaxial with said first bush (62); said first bush (62) and said second flexible bush (63) arranged and positioned for expanding said second flexible bush (63) by axial displacement of said first bush (62), thereby causing an outer surface of a conical portion (21) of a toolholder body (12, 14) of said cutting tool to be pushed against an inner surface of a conical portion (43) of a cavity (41) formed in said first supporting and fast-fit connecting means (30, 31), said expansion furthermore causing a pressing action of toolholder body (12, 14) on a surface (69) integral with said first supporting and fast-fit connecting means (30, 31).

2. A machine (1) as claimed in claim 1, wherein said toolholder body (12, 14) comprises a projecting element (67) which is inserted inside said first bush (62).

3. A machine (1) as claimed in claim 1, further comprising a tie (46) stressed by elastic means (52) for moving said first bush (62).

4. In a machine (1) for cutting workpieces (2) and featuring pressure clamping devices (25) for clamping the workpieces; the machine (1) including a frame (3) including a substantially horizontal worktable (4) and guides (5) extending to the sides of the frame (3) in a given substantially horizontal direction (6); and a carriage (7) fitted in freely-sliding manner to said guides (5) so as to move, in relation to said frame (3), to and from an idle position wherein said carriage (7) is located laterally in relation to said worktable (4);

the improvement wherein said carriage (7) houses fast-fit connecting means (30, 31) for a toolholder body (12, 14) and having a respective longitudinal first axis (32, 33) perpendicular to said direction (6);

said toolholder body (12, 14) holding at least one tool (29);

said fast-fit connecting means (30, 31) having a cavity (41) formed therein, the cavity including a portion (43);

said fast-fit connecting means (30, 31) comprising a first bush (62) and a second flexible bush (63) coaxial with said first bush (62); said first and second bushes (62, 63) arranged and positioned within a portion (21) of said toolholder body (12, 14) for flaring said second flexible bush (63) by axial displacement of said first bush (62), thereby causing an outer surface of said portion (21) of toolholder body (12, 14) to be pushed against an inner surface of said portion (43) of cavity (41), said flaring furthermore causing a pressing action of toolholder body (12, 14) on a surface (69) integral with said fast-fit connecting means (30, 31).

5. The machine according to claim 4, wherein said workpieces comprise panels and said tool comprises a cutting tool for cutting said panels.

6. The machine according to claim 4, wherein said portion (43) of said cavity (41) has a substantially conical shape and said portion (21) of toolholder body (12, 14) has a substantially conical shape, said outer surface of said substantially conical portion (21) being pushed against said inner surface of said substantially conical portion (43) when said second flexible bush (63) is flared by axial displacement of said first bush (62).

7. The machine according to claim 4, further comprising:

linear actuators (56, 58) coaxial with spindles of said fast-fit connecting means (30, 31), each linear actuator having a rod (61);

respective ties (46) connecting said rod (61) of said linear actuators (56, 58) to said first bush (62) of said fast-fit connecting means (30, 31); and a central control unit for operating each said linear actuator to move to and from a withdrawn idle position thereby to cause said respective tie (46) thereof to displace a respective first bush (62) axially to flare said second flexible bush (63) to push said outer surface of said portion (21) of said toolholder body (12, 14) against said inner surface of said portion (43) of said cavity (41).

* * * * *